United States Patent Office 3,766,077
Patented Oct. 16, 1973

3,766,077
COMPOSITIONS AND METHOD FOR INHIBITING SCALING IN AQUEOUS SYSTEMS
Chih M. Hwa, Arlington Heights, Ill., and Ralph T. Moran, Sarasota, Fla., assignors to Chemed Corporation, Cincinnati, Ohio
No Drawing. Continuation of abandoned application Ser. No. 105,660, Jan. 11, 1971. This application Aug. 16, 1972, Ser. No. 281,266
Int. Cl. C02b 5/06
U.S. Cl. 252—180
1 Claim

ABSTRACT OF THE DISCLOSURE

Mixtures of lignosulfonic acid or water-soluble lignosulfonates and water-soluble organic polymers consisting of repeated groups with the formula:

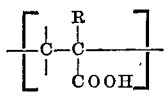

wherein R is hydrogen or a methyl group, or water-soluble salts or esters of such polymers inhibit the formation of alkaline earth salt scales in aqueous systems.

---

This is a continuation of application Ser. No. 105,660, filed Jan. 11, 1971, now abandoned.

This application is a continuation-in-part of prior copending U.S. application Ser. No. 708,747, filed Feb. 28, 1968, and now abandoned.

This invention relates to a composition and method for inhibiting the formation of calcium and magnesium containing scales in aqueous systems. In particular, this invention relates to a combination of water-soluble acrylic polymers and lignosulfonates and its use to prevent scaling of surfaces in contact with aqueous solutions. The invention is primarily concerned with inhibition or prevention of scale formation by alkaline earth compounds. It may also be used for inhibition or prevention of metallic oxide and silica scales.

In summary, the composition of this invention for inhibiting scale formation by alkaline earth salts in aqueous systems comprises from 1 to 50 parts by weight of lignosulfonic acid or its water-soluble salts and from 1 to 50 parts by weight of a water-soluble organic polymer having a molecular weight from 200 to 15,000,000 and having repeated groups with the formula:

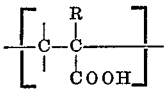

wherein R is hydrogen or a methyl group, and water-soluble salts and esters thereof.

In summary, the process of this invention for treating an aqueous system to inhibit scale formation by alkaline earth salts dissolved therein comprises dispersing into said aqueous system at least 0.02 part per million (hereinafter "p.p.m.") of the above composition.

The deposition of scale, particularly carbonates, hydroxides, phosphates, silicates and sulfates of calcium and magnesium from aqueous solutions on heat transfer surfaces is a serious indutrial problem, especially in cooling water systems, cooling tower systems, industrial evaporators and boilers, and evaporators for recovering potable water from sea water, brines, brackish water, sewage and the like. These common scale forming compositions including the hydroxides are hereinafter denoted as "alkaline earth salts." Because of their inverse solubility, these compounds tend to precipitate onto heat exchange surfaces where they reduce heat transfer rates and prevent proper water circulation. In cooling tower systems where the cooling effect is achieved by evaporating a portion of the circulating water passing through the tower, and in boilers and evaporators where a portion of the water is continuously removed as vapor or gas, the problem of scale formation is further intensified by concentration.

A wide variety of techniques have been previously proposed for preventing or removing scale in heat exchange systems. Mechanical scale removal techniques are expensive and often require dismantling the heat exchange equipment. Acids such as sulfuric, hydrochloric and sulfamic acids can be used to inhibit scale, but these chemicals are hazardous and can be handled only by trained personnel. In addition, these acids are highly corrosive to metal components of heat exchangers, and very careful control of the acid feed must be maintained to avoid damage to the equipment being treated. The use of certain polyectrolytes to inhibit scaling has been suggested in Herbert et al., U.S. Patent 3,293,152 and Booth et al., U.S. Patent 3,463,730. However, it has been observed that these suggestions are not always as effective as desired.

It is an object of this invention to provide an improved process for inhibiting or preventing formation of alkaline earth salt scales on heat exchange surfaces in aqueous systems using a more effective composition.

All concentrations are herein given as weight percents or parts by weight unless otherwise specified.

The composition of this invention contains from 2 to 98, and preferably from 4 to 40 percent of lignosulfonic acid or a water-soluble salt thereof such as a sodium, potassium, or ammonium salt.

The composition of this invention also contains from 2 to 98, and preferably from 4 to 30 weight percent of a water-soluble organic polymer having a molecular weight of from 200 to 15,000,000 and having repeated groups with the formula:

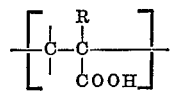

wherein R is hydrogen or a methyl group, or water-soluble salts or esters thereof.

Suitable polymers for use in this invention are the polymers of acrylic or methacrylic acid and their derivatives, for example, acrylic acid, the alkali metal and ammonium salts of acrylic acid, esters of acrylic acid with lower ($C_1$ to $C_4$) alkanols, methacrylic acid, the alkali metal and ammonium salts of methacrylic acid, esters of methacrylic acid with lower ($C_1$ to $C_4$) alkanols, and copolymers of these acids and derivatives with each other. Such polymers include, for example, polyacrylic acid, ammonium polyacrylate, sodium polyacrylate, ammonium polymethacrylate, sodium polymethacrylate, diethanolammonium polyacrylate, guanidinium polyacrylate, dimethyl-aminoethyl polymethacrylate, methacrylic acid-dimethylaminoethyl methacrylate copolymer, acrylic acid-methacrylic acid copolymer, the sodium salt of acrylic acid-methacrylic acid copolymer, and the like. The preferred polymers are polyacrylic acid, polymethacrylic acid, or water-soluble salts of these polymers having a molecular weight within the range of from 1,000 to 200,000, calculated as the free acid, e.g., polyacrylic acid.

The process of this invention for treating aqueous systems to inhibit scale formation by alkaline earth salts dissolved therein comprises dispersing into the aqueous system at least 0.02 and preferably at least 0.2 p.p.m. of the composition of this invention.

The composition can also contain or be used with other scale inhibitors, antifoams, corrosion inhibitors, biocides, dispersion or solution aids, and the like.

In inhibiting the formation of calcium and magnesium containing scales from aqueous systems, the combination of the lignosulfonate and the water-soluble organic polymer exhibits synergistic effects.

The process of this invention for inhibiting scaling is not limited to any particular type of aqueous system. It is effective in the aqueous systems having temperatures of up to 350° Fahrenheit and higher including cooling water systems, cooling towers, boilers, evaporators, water heaters, and the like. Scale formation from fresh water, brackish water, brines, sea water, sewage effluents, and the like are inhibited by this process.

This invention is further illustrated by the following specific but non-limiting examples.

EXAMPLE 1

In this example, several compositions were tested by a Calcium Carbonate Deposition Test and a Turbidity Test.

In this test, circulating water having the following composition was used:

|  | P.p.m. |
|---|---|
| Calcium sulfate dihydrate | 445 |
| Magnesium sulfate heptahydrate | 519 |
| Sodium bicarbonate | 185 |
| Calcium chloride | 136 |
| Kaolin | 100 |
| Cooling tower sludge (solid basis) | 50 |

During the test, the circulating water was fed to a closed circulating test system at a rate of 5 gallons per day, the overflow from the test system being discharged to waste. In the closed circulating system, circulating water having a temperature of 130° Fahrenheit and pH of 7.5–8.0 was passed a rate of one gallon per minute through an arsenical admiralty brass tube for the scaling test. The brass tube was surrounded by a jacket through which a heating liquid having an initial temperature of 240° Fahrenheit flowed countercurrently. The circulating water was then then cooled to 130° Fahrenheit and recirculated through the system. The total circulating time for each test was 10 days. The turbidity of the makeup water and the effluent was measured during the test by using a photoelectric colorimeter (Lumetron Colimeter, Model No. 401) at a wave length of 650 millimicrons ($m\mu$) and 40-millimeter light path. At the end of each test, the admiralty brass tube was removed; scale from representative areas of the tube interior was removed and weighed to determine the weight gained per unit area due to scaling.

The results are shown in Table A.

TABLE A

| Test No. | Additive | Additive conc. in system, p.p.m. | Scale, mg. | Percent light trans. of effluent-percent light trans. of makeup |
|---|---|---|---|---|
| 1 | None | | 224.8 | 24.0 |
| 2 | Sodium lignosulfonate | 2.5 | 407.6 | 16.3 |
| 3 | Polyacrylic acid (molecular weight 90,000). | 0.94 | 221.2 | 24.1 |
| 4 | Sodium lignosulfonate plus polyacrylic acid (molecular weight 90,000). | 2.5 | 64.6 | 3.5 |

As shown in Table A, scale deposition was synergistically decreased in Test 4 demonstrating the synergistic cooperation of the ingredients in the composition of this invention. Similar results were also found with the Turbidity Test. The use of polyacrylic acid alone (as suggested by Herbert et al., U.S. Pat. 3,293,152) or of sodium lignosulfonate alone, did not satisfactorily control scaling under the conditions of the test.

EXAMPLES 2–5

The following compositions, when added in concentrations sufficient to provide from 0.2 to 50 p.p.m. of combined weight of the lignosulfonic acid compound and water-soluble polymer or polymer salt, were found to greatly inhibit the formation of calcium and magnesium containing scale from aqueous solutions on heat exchange surfaces.

TABLE B

| Example No. | Composition |
|---|---|
| 2 | Sodium lignosulfonate, 10%; sodium polyacrylate (molecular weight, 120,000), 4%; water, 86%. |
| 3 | Potassium lignosulfonate, 5%; polymethacrylic acid (molecular weight, 9,000), 5%; water, 90%. |
| 4 | Lignosulfonic acid, 4%; potassium polymethacrylate (molecular weight, 20,000), 6%; water, 90%. |
| 5 | Sodium lignosulfonate, 85%; sodium polymethacrylate (molecular weight, 300,000), 15%. |

COMPARATIVE TESTS

In a comparative test the scale inhibiting efficacy of acrylamide-acrylic acid copolymers, as suggested by Booth et al., U.S. Pat. 3,463,730, was determined. The test procedure and conditions were identical to those described above except that the circulating water used in the test had the following composition.

|  | P.p.m. |
|---|---|
| Calcium sulfate dihydrate | 1136 |
| Magnesium sulfate heptahydrate | 252 |
| Sodium bicarbonate | 185 |
| Calcium chloride | 784 |
| Silica | 30 |
| Kaolin | 150 |
| Ferric oxide | 20 |
| Phosphate ($PO_4$—as sodium polyphosphate) | 75 |

The results of this further test were as follows:

| Test No. | Treatment | Scaling rate—in milligrams per (square decimeter) (day) |
|---|---|---|
| 5 | None | 51.9 |
| 6 | 1.2 p.p.m. of partially hydrolyzed polyacrylamide; molecular weight 10,000; 30 percent unhydrolyzed amide groups. | 80.3 |

As seen from the results in Test 6, the partially hydrolyzed polyacrylamide is not satisfactory for controlling scaling under the conditions of the test.

In another comparative test (Test No. 7) the test procedure end conditions were identical to those described for Test Nos. 5 and 6. In Test No. 7 the treatment additives were 1.2 p.p.m. of the same polymer used in Test No. 6 together with 2.0 p.p.m. of sodium lignosulfonate. The scaling rate in this test was 50.7 milligrams per (square decimeter) (day). This result indicates that a combination of partially hydrolyzed polyacrylamide and lignosulfonate is also not satisfactory for controlling scaling under the test conditions described.

What is claimed is:

1. A method for treating aqueous systems to inhibit scale formation by alkaline earth salts dissolved therein, said method comprising dispersing into said aqueous system 2.5 p.p.m. of sodium lignosulfonate and 0.94 p.p.m. of polyacrylic acid having a molecular weight of 90,000.

References Cited

UNITED STATES PATENTS

| 3,463,730 | 8/1969 | Booth | 210—58 |
| 3,293,152 | 12/1966 | Herbert | 257—82 L |

MAYER WEINBLATT, Primary Examiner

U.S. Cl. X.R.

21—2.7; 134—2.3, 41; 210—54, 58, 59; 252—181, 8.55 B, 82, 84, 85